H. H. SPRAGUE.
GAS METER.
APPLICATION FILED NOV. 13, 1917.
1,293,965.
Patented Feb. 11, 1919.
2 SHEETS—SHEET 1.
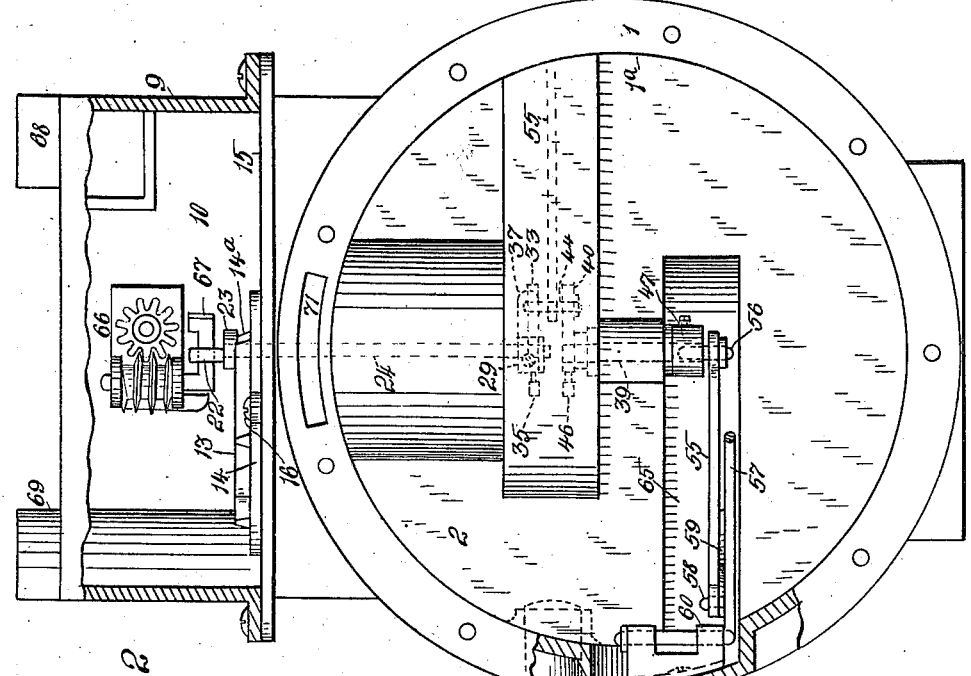
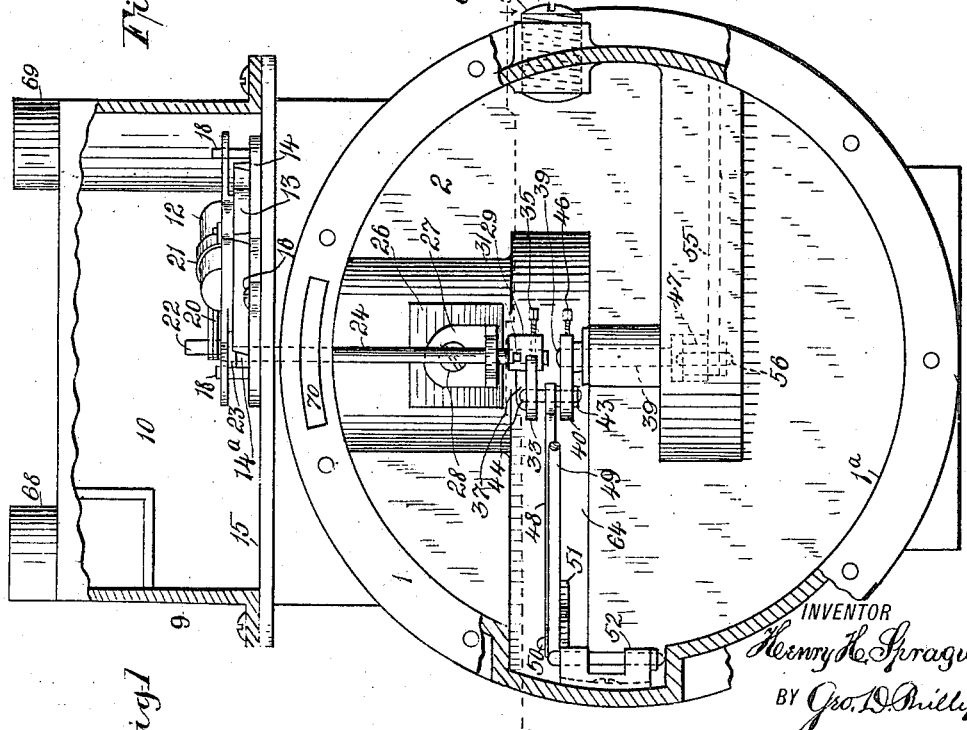

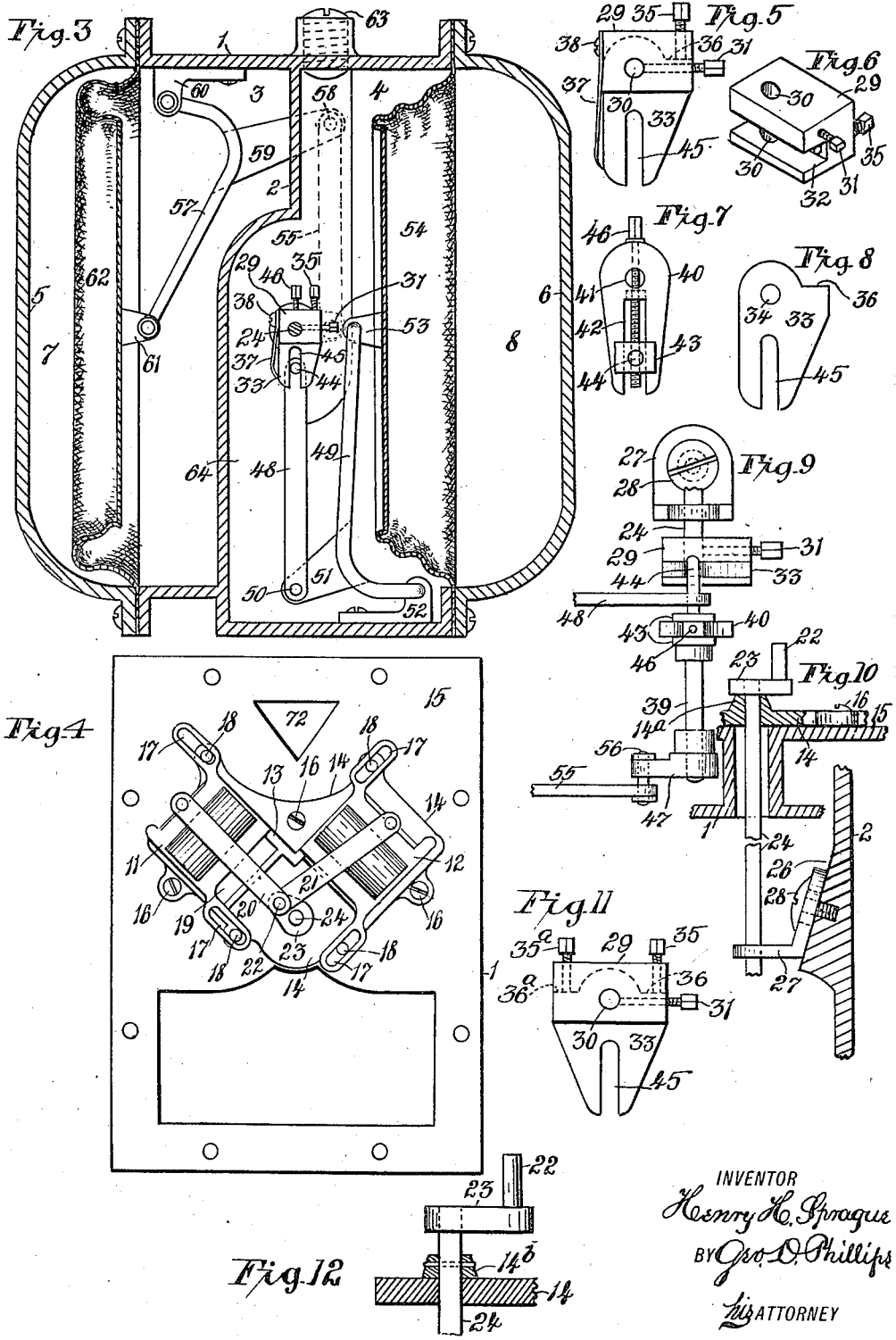

UNITED STATES PATENT OFFICE.

HENRY H. SPRAGUE, OF BRIDGEPORT, CONNECTICUT, ASSIGNOR TO SPRAGUE METER COMPANY, OF BRIDGEPORT, CONNECTICUT.

GAS-METER.

1,293,965.  Specification of Letters Patent.  Patented Feb. 11, 1919.

Application filed November 13, 1917. Serial No. 201,750.

*To all whom it may concern:*

Be it known that I, HENRY H. SPRAGUE, a citizen of the United States, residing at Bridgeport, in the county of Fairfield and State of Connecticut, have invented certain new and useful Improvements in Gas-Meters; and I do hereby declare the following to be a full, clear, and exact description of the invention, such as will enable others skilled in the art to which it appertains to make and use the same.

My invention relates to improvements in gas meters, and it consists in certain details relating to the meter's adjustment and construction. In gas meters of this type, it is essential that there be two adjustments, one to make the diaphragm displacement accurately correspond with the quantity indicated by the meter index, and the other to synchronize the diaphragm movements with the opening and closing of the valves, thus producing an even flow through the meter and doing away with the necessity and expense of absolute accuracy of manufacture and assembling of the several operative elements of the meter construction. It is evidently desirable that these adjustments be located as close together as possible, and that they be readily accessible from the outside of the meter, and operated with a single tool from a single opening in the body of the meter.

Referring to the drawings,—

Figure 1 represents a front elevation partly in section of the meter body with the recessed side covers and index mechanism removed;

Fig. 2 is a rear elevation of the meter body partly in section with the recessed side covers and valves removed;

Fig. 3 is a sectional view of the meter body on line 3—3 of Fig. 1, also a sectional view of the recessed side covers secured to the meter body;

Fig. 4 is a plan view of the upper surface of the meter body showing the valve arrangements;

Figs. 5, 6, 7 and 8 are enlarged detail views of the several elements relating to the valve and diaphragm adjustments.

Fig. 9 is an enlarged detail view of the assembled adjustable elements, enlarged broken view of the valve crank shaft and one of the diaphragm connecting links, also enlarged view of the adjustable bracket for centralizing the valve crank shaft, also an enlarged view of the lower crank shaft and mechanism connected therewith;

Fig. 10 is an enlarged broken view of the valve crank shaft, broken view partly in section of the valve seat base having a raised portion to form a gas tight seat with the valve crank, broken sectional view of the upper part of the meter body, broken sectional view of the central partition of the meter showing the adjustable valve crank shaft bracket in place;

Fig. 11 is an enlarged detail view of the adjustable crank of the valve crank shaft showing a more positive means for adjusting the same, and;

Fig. 12 is an enlarged broken sectional view of the valve seat base, broken view of the valve crank shaft, sectional view of a detachable blind valve employed when the valve actuating crank is elevated.

The meter body 1 has the bore $1^a$ therethrough and central partition 2, dividing the body into the two gas measuring chambers 3—4, and the two recessed side covers 5—6, when secured to the meter body, form the additional gas measuring chambers 7—8. The cap 9 forms the gas distributing chamber 10 wherein are located the valves 11—12, Fig. 4, mounted to operate on the valve seat 13 forming an integral part of the base 14 secured to the upper surface 15 of the meter body by screws 16. The valves are provided with the guide slots 17 embracing the guide pins 18 projecting from the valve seat base to keep the valves in proper alinement with the several valve seat ports, one only, 19, Fig. 4, being shown. Links 20—21, connect the valves in the usual manner with the crank pin 22 of the valve crank 23 secured to the upper end of the shaft 24. The crank 23 rests on the boss $14^a$ integral with the valve seat base 14, thus forming a gas check or blind valve to effectively prevent gas leaking past the upper journal of the rotating valve crank shaft 24. If found advisable to elevate the valve-seat, it would also be necessary to elevate the valve actuating crank 23 to correspond thereto. In such a case the collar $14^b$—Fig. 12—would be secured to the shaft 24 and rest on the base to serve the same purpose as a gas check or blind valve as the crank 23 does in Fig. 10.

26, Fig. 10, is an inclined projection of the central partition 2, and to this inclined projection is adjustably secured the bracket 27 by means of the screw 28. The lower end of the valve crank shaft 24 is journaled in this bracket which can readily be adjusted on its inclined seat to maintain the vertical alinement of said shaft.

An adjustable crank is mounted on the inner end of the valve crank shaft 24 comprising the support 29, Fig. 6, having holes 30 therethrough to receive said shaft, and is secured thereto by the set screw 31. Within the recess 32 of the support is freely located the crank-arm 33, Fig. 5, having the hole 34, Fig. 8, registering with the holes 30 of the support and is journaled on the shaft 24. This crank arm is laterally adjusted on said shaft by means of the screw 35, of the support 29, engaging said crank arm. 37 is a spring secured to the support by the screw 38. The outer end of this spring bears against the edge of the crank arm to keep it normally against the screw 35. In Fig. 11 is shown a more positive means for maintaining the crank arm in any of its adjusted positions, which consists in providing the duplicate shoulder 36$^a$ on the arm, and the screw 35$^a$ for the support, both screws 35, 35$^a$, normally engaging the shoulders 36—36$^a$ of the arm.

The lower crank-shaft 39, Figs. 1 and 2, is journaled in the central partition 2 and it carries the crank 40 having the hole 41 to admit the upper end of this lower crank-shaft, and to which it is secured. In the elongated opening 42 of the crank 40 is slidably mounted the block 43 carrying the crank-pin 44—see also Fig. 9. This block is adjusted in said opening by means of the screw 46, passing through the shaft 39 and the crank-pin 44, which pin projects up into the elongated opening 45 of the lower crank arm 33 of the valve crank-shaft, Figs. 3 and 9. By means of the adjustable crank arm 33 and the crank-pin 44, the fixed valve crank 23 of the upper crank-shaft, and the fixed cranks 40 and 47 of the lower shaft can be accurately adjusted with respect to their relative operative positions by means of the adjusting screw 35. The link 48, Fig. 3, connects the crank pin 44 with the diaphragm lever 49 through the medium of the pin 50 and arm 51. The lever 49 is journaled in the bracket 52 attached to the side of the meter body and also in the bracket 53 attached to the diaphragm 54.

The link 55 connects the crank pin 56 of the crank arm 47 with the diaphragm lever 57 through the medium of the pin 58 and arm 59. The lever 57 is journaled in the bracket 60 of the meter body and the bracket 61 of the other diaphragm 62.

63 is a removable screw in the side of the meter body filling a threaded hole in alinement with the centrally located crank adjusting mechanism. This hole is large enough to admit a socket wrench or other suitable tool adapted to adjust the interior meter mechanism. The screw 35, as before mentioned, adjusts the relative operative positions of the valve actuating crank 23 and the lower fixed cranks 40 and 47 and thus synchronizes the diaphragm movements with the movements of the valves, while the screw 46 adjusts the diaphragm displacement. Being thus able to make all of the necessary meter adjustments without removing the side covers or the cap of the gas distributing chamber, or otherwise disturbing or interfering with the meter construction, is of great economical importance both in the saving of time and labor.

The upper recess 64 and the lower recess 65, Figs. 1 and 2, are formed in the central partition 2 to afford suitable room for the movement of the parts connected with the centrally located crank mechanism and the operative parts connected therewith.

The index dial—not shown—is connected with its usual operative mechanism 66, Fig. 2, adapted to be actuated in the usual manner by the engagement of the crank pin 22 with the flag 67. 68 is the usual gas intake, and 69 the outlet. The usual side ports 70 and 71, and the exhaust ports 72, are also shown.

Having thus described my invention, what I claim is:—

1. A gas meter of the character described comprising a body having a bore therethrough and a partition dividing the bore, an overlying gas distributing chamber, valves therein, a crank shaft operatively connected with the valves and projecting within the body, a support in which the shaft is journaled, and the partition having an inclined seat on which the support is adjustably secured to effect a universal adjustment of the shaft.

2. A gas meter of the character described having a body and a gas distributing chamber, valves therein, a shaft, a fixed crank mounted thereon and operatively connected with the valves, said shaft projecting within the body, a support secured to the inner end of the shaft, a crank arm journaled on the shaft, and means on the support for effecting a lateral adjustment of said crank arm.

3. A gas meter of the character described having a body, diaphragms within the body, an overlying gas distributing chamber and valves located therein, a shaft carrying a fixed crank at one end operatively connected with the valves, the opposite end of said shaft located within the body, an adjustable crank mounted on that part of the shaft within the body, a second shaft below the valve crank shaft, a fixed crank at each end, an adjustable crank pin carried by one of the cranks of said lower shaft and operatively connected with one of the diaphragms and with the adjustable crank of the valve crank shaft and the other crank of the lower shaft operatively connected with the other diaphragm, means carried by the adjustable crank to adjust the relative operative positions of all of the fixed cranks and thus synchronize the diaphragm movements with the movements of the valves, and means for actuating the adjustable crank pin to adjust the diaphragm displacement.

4. A gas meter of the character described having a body, a gas distributing chamber, valves therein, a valve crank shaft operatively connected with the valves and projecting within the body, an adjustable crank arm journaled thereon, diaphragms within the body, a second crank shaft located below the valve crank shaft, a fixed crank mounted on each end thereof, the lower crank operatively connected with one of the diaphragms, the upper crank of said underlying shaft carrying a crank-pin operatively connected with the other diaphragms and the said adjustable crank arm, and means for adjusting said pin and arm, said body having a normally closed opening through which said adjustments can be made from the outside of the meter.

5. A gas meter comprising a body having central measuring chambers, a gas distributing chamber and valves therein, diaphragms forming gas measuring chambers located below the gas distributing chamber, means for adjusting the displacement of the diaphragms, and means for synchronizing the diaphragm movements with the movements of the valves, both of said means being located in one of the central measuring chambers.

In testimony whereof I affix my signature.

HENRY H. SPRAGUE.

Copies of this patent may be obtained for five cents each, by addressing the "Commissioner of Patents Washington, D. C."